April 13, 1943.   J. E. HINES   2,316,430
AUTOMOBILE JACK
Filed Feb. 2, 1942

Inventor
John E. Hines
By Dowell & Dowell
Attorneys

Patented Apr. 13, 1943

2,316,430

UNITED STATES PATENT OFFICE 2,316,430

AUTOMOBILE JACK

John E. Hines, Rochester, Minn.

Application February 2, 1942, Serial No. 429,313

12 Claims. (Cl. 254—94)

This invention relates to automobile jacks, the present application being an improvement upon the jack shown in my U. S. Letters Patent No. 2,270,004 dated January 13, 1942, and that disclosed in my copending application Serial No. 419,498, filed November 17, 1941.

In my aforesaid patent and application the automobile jacks consisted of a base having a roughened undersurface so that same would remain during the jacking operation relatively fixed upon the ground or road surface, the base having pivoted thereon the lower end of a swinging bar normally inclined to the road surface, and said bar having removably secured to its upper end a bracket adapted to be secured in rigid position on the bumper or on the body of the automobile, whereby when so applied, upon movement of the automobile a short distance forward or backward, the swinging bar would raise the body and consequently the wheel of the automobile adjacent the jack above the ground surface since the bar would be shifted into substantially vertical position, the motor of the automobile itself being thus utilized to provide the necessary power to shift the vehicle and raise the wheel above the ground to permit changing of tires, or the application of non-skid chains, or to permit small repairs, thereby dispensing with the necessity of manually actuating a jack to raise the body or wheel.

My present improvement consists in providing, in place of the relatively fixed base disclosed in my aforesaid patent and application, a novel swingable bar pivoted at its upper end to the bumper or body bracket, said bar carrying at its lower end a bearing for a relatively large axle carrying ground wheels fixedly secured to the axle for rotation therewith, said axle carrying ratchet teeth engaged by opposed spring pressed pawls normally holding the axle against rotation in either direction, means being provided on the swinging bar adapted to be actuated when the bar is in normal raised position contacting the vehicle bumper, body or bracket, to release one of said pawls so as to permit the wheels of the axle to roll along the road surface in the direction of movement of the automobile after completion of the jacking operation, thus permitting the automobile to be moved forwardly, or backwardly as the case may be, beyond the point necessary to fully jack the car. By such construction, if an inexperienced person when using the jack should move the automobile beyond the point necessary to swing the bar into full jacking position, no damage to the automobile bumper, jack, or bracket would be encountered, my novel jack thus adding safety to the operation of the jack by rendering it impossible for the person using the jack to do any damage to the car, jack or bracket by overshooting the point at which he would stop the forward or backward movement of the car during the jacking operation. The other spring pressed pawl in constant engagement with the ratchet teeth is adapted to prevent rotation of the axle and wheels in the opposite direction, so that when it is intended to unjack the car the vehicle may be moved in the reverse direction swinging the bar away from contact with the bumper body or bracket and releasing the pawl actuating means above mentioned so that the first pawl will be restored to its normal position. The axle will then be held against rotation in either direction, and the locked wheels of the axle will merely rock while remaining relatively immovable on the road or ground surface, so that while the automobile is in reverse motion the swingable bar will be swung into the original position it had assumed before the automobile was jacked.

I will explain the invention with reference to the accompanying drawing, which illustrates one practical embodiment thereof to enable others to adopt and use the same; and will summarize in the claims the novel features of construction, and novel combinations of parts, for which protection is desired.

Figure 4:
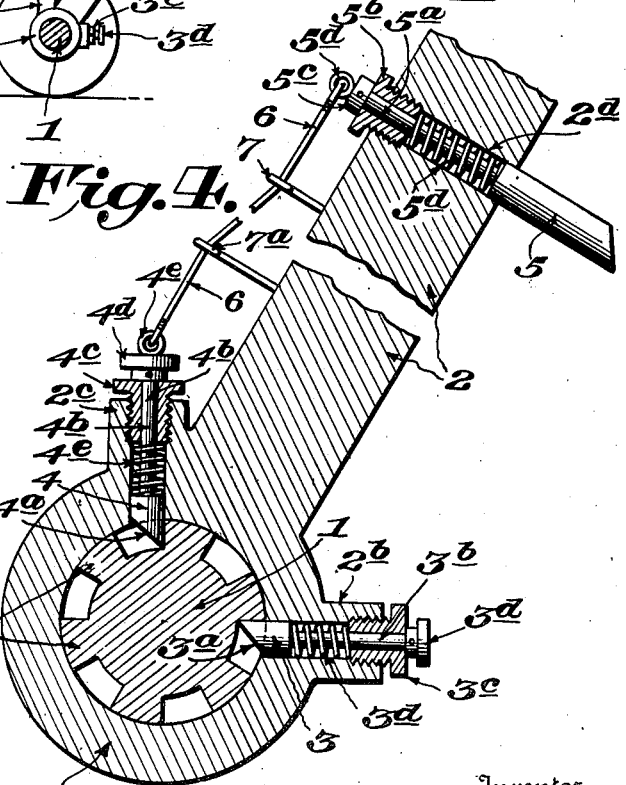
Fig. 4 is an enlarged vertical section through the lower portion of the swinging bar, showing the opposed spring pressed pawls engaging the ratchet teeth of the axle, and showing the pawl releasing mechanism.

As shown, the jack preferably comprises a swinging bar 2 preferably of rectangular cross-section and of sufficient rigidity to support a portion of the weight of the automobile body, said bar 2 having at its lower end a bearing 2a for an axle 1 having fixed thereon at opposite sides of the bearing 2a ground wheels 1a, the axle 1 rotating with the wheels 1a. Axle 1 is prevented from axial movement in the bearing 2a by any suitable means; and within bearing 2a the axle 1 is provided with ratchet teeth 1b (Fig. 4) formed by recessing the axle, six such ratchet teeth being indicated in the drawing. However, a more or less number of teeth 1b may be provided.

Extending into bearing 2a, disposed substantially horizontally, is a spring pressed pawl 3 having its inner end beveled as at 3a whereby axle 1 may rotate in the counterclockwise direction but the pawl will prevent rotation of the axle in the clockwise direction. Preferably the pawl 3 is provided with a stem 3b passing through a nut 3c threaded into a boss 2b formed on the side of bearing 2a, said stem 3b being provided with a knob 3d at its outer end whereby the pawl 3 may if desired be manually shifted outwardly for disengagement from the ratchet teeth 1b. A coil spring 3d is interposed between pawl 3 and the inner end of nut 3c, within the bore of boss 2b, said spring normally urging the pawl 3 inwardly into contact with ratchet teeth 1b to prevent rotation of axle 1 in the clockwise direction.

On bearing 2a is a second boss 2c disposed vertically, said boss housing a second slidable and opposed pawl 4 having its outer end beveled as at 4a in a direction opposite from the bevel of pawl 3, whereby the pawl 4 when engaged with teeth 1b will permit rotation of axle 1 in the clockwise direction, but will prevent rotation of axle 1 in the counterclockwise direction. Pawl 4 is also provided with a stem 4b extending through a nut 4c tapped into the outer end of boss 2c, said stem having a knob 4d on its outer end provided with an eye 4e, for the purpose hereinafter described. Within the boss 2c is a spring 4e interposed between pawl 4 and the inner end of nut 4c, said spring normally urging the pawl 4 inwardly into engagement with ratchet teeth 1b.

Figure 1:
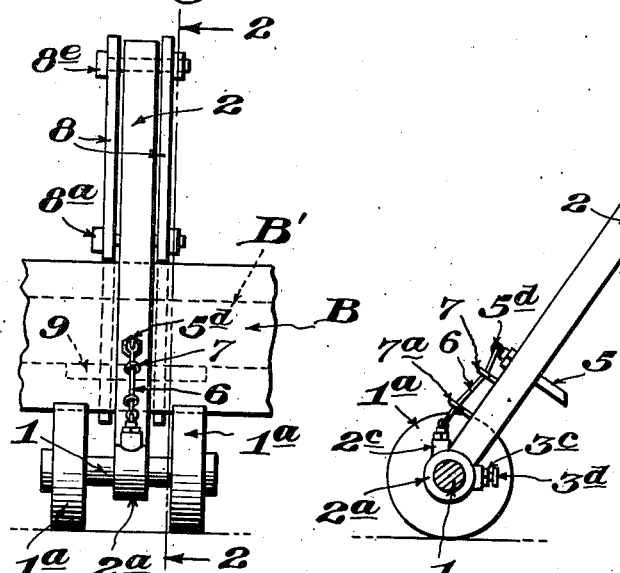
Fig. 1 is an elevation of my novel jack applied to the bumper of an automobile.
Figure 2:
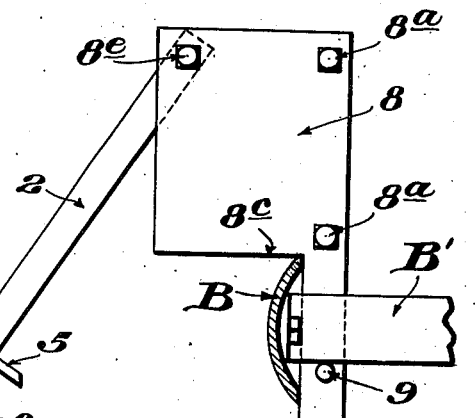
Fig. 2 is a side elevation of the parts shown in Fig. 1 showing position of the parts of the jack immediately before or after the jacking operation.
Figure 3:
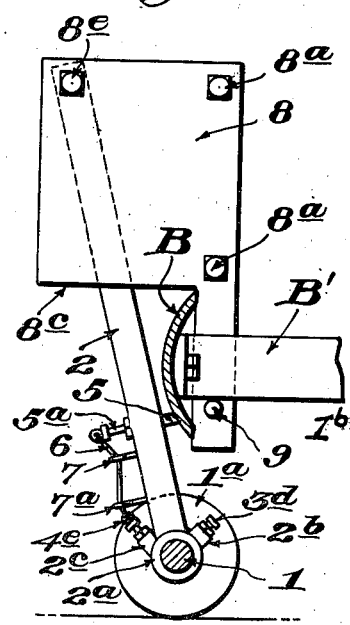
Fig. 3 is a side elevation showing the position of the parts in fully jacked position, the pawl releasing plunger on the swinging bar contacting the bumper of the automobile.

Extending through a bore 2d in the swinging bar 2, at such point above bearing 2a as to contact with the bumper bar B of the vehicle, or some other fixed portion of the vehicle body, or the jack bracket hereinafter described, is a spring pressed plunger 5 projecting from the same face of the bar 2 as the knob 3d of ratchet 3, said plunger 5 having a stem 5a passing through a nut 5b threaded into the bore in bar 2 for the plunger 5, said stem 5a having a head 5c on its end adjacent the nut 5b to limit the outward movement of the plunger. Within bore 2d is a spring 5d interposed between the inner end of the plunger 5 and the inner end of the nut 5b, said spring normally maintaining the plunger projected out of the bore 2d and into position shown in Figs. 2 and 4. Head 5c of stem 5a carries an eye 5d, and a flexible wire or cord 6 passes through guides 7 and 7a mounted on the face of swinging bar 2, said wire 6 having its ends connected to the eyes 5d and 4e in such manner that when the plunger 5 is in position shown in Figs. 2 and 4 the pawl 4 will be in engagement with the ratchet teeth 1b, but when plunger 5 is shifted within bore 2d, against the action of spring 5d, by contact with the bumper bar B as shown in Fig. 3, the eye 5d will be shifted and will thereby pull wire 6 and raise the stem 4b of pawl 4 so that said pawl 4 will be disengaged from ratchet teeth 1b, thus permitting axle 1 to rotate in the counterclockwise direction, the pawl 3 preventing rotation of the axle only in the clockwise direction. However, normally when both pawls 3 and 4 are engaged with the ratchet teeth 1b, axle 1 is prevented from rotation in the bearing 2a in either direction so that the wheels 1a will not be permitted to roll along the ground during the jacking operation until the vehicle has been fully jacked, or in the present case, until the swinging bar 2 has been shifted from the position shown in Fig. 2 into the position shown in Fig. 3, at which time the plunger 5 is contacting the bumper bar B of the automobile.

The upper end of bar 2 is perforated to receive a pivot bolt 8e carried by a bracket which in the present embodiment is shown as applied to the conventional front or rear bumper bar B of the vehicle which extends across the front or rear end of the vehicle projecting beyond the ends of the automobile body, said bumper bar B being secured to the vehicle body by means of bumper braces B' which, as shown in Fig. 3, are usually disposed in pairs which diverge outwardly usually on an arc so as to be tangent to the bumper bar B at their outer ends and to be contacting at their inner ends adjacent the body of the vehicle, the outwardly flaring pairs of brace bars B' forming with the bumper bar B substantially triangular openings between the rear face of bumper bar B and the inner faces of braces B' which space is adapted to receive the jack bracket.

The bracket shown is substantially the same as that shown in my copending application Serial No. 419,498, filed November 17, 1941, and consists of a pair of spaced parallel plates 8 secured in spaced relation by a row of rivets 8a extending adjacent one vertical edge passing through spacing washers interposed between the plates 8. One lower corner of the bracket plates 8—8 is cut away as at 8c to form a shoulder adapted to seat directly upon the top of bumper bar B as indicated in Figs. 2 and 3, while the adjacent lower portion of the bracket is adapted to extend down behind bumper bar B to a point somewhat below the lower edge thereof, the extended portion having aligned openings therein to receive a lifting bar 9 of sufficient length to extend through the plates 8—8 and under the bumper braces B' at a point adjacent bumper bar B as indicated in Fig. 3, so that when the bracket is thus secured in the position, a lift or upward thrust on the bracket 8—8 will lift the bumper and the adjacent end or corner of the body, and also the adjacent wheel. The upper end of lifting bar 2 extends between the plates 8—8 above shoulder 8c, and is pivotally connected to the bracket 8—8 by the bolt, rivet, or pin 8e which may be removably or permanently secured in the bracket. The particular form of bracket however forms no part of my present invention, and the bracket may take the form of those shown in my U. S. Letters Patent No. 2,270,004 issued January 13, 1942, or any other desired form.

In applying the jack to the automobile, the bracket 8—8 is positioned with respect to bumper bar B as shown in Fig. 2, while bar 9 is removed, and then the bar 9 is inserted in the holes in the lower end of the bracket so as to extend beneath the bumper braces B'. When the automobile is moved under its own power in a direction towards the axle 1 the swinging bar 2 will be swung into substantially vertical position as shown in Fig. 3 thereby raising the bumper and the adjacent end or corner and wheel of the automobile, the bumper bar engaging the swinging bar 2 limiting the swinging movement of bar 2 away from its normal position shown in Fig. 2.

In order to prevent injury to the bumper bar B, the brackets 8—8, or the swinging bar 2, as soon as the plunger 5 impinges upon the bumper B during the jacking operation, as shown in Fig. 3, the plunger 5 will be shifted and will exert a pull upon the wire 6, raising the spring pressed pawl 4 out of engagement with the ratchet teeth 1b; and thus continued movement of the vehicle in the jacking direction will permit the ground wheels 1a of the jack to merely roll along the road or ground surface in the direction of movement of the automobile during the jacking operation, rendering it impossible for the operator using the jack to do any damage to the car or jack by overshooting the point at which he should stop the movement of the automobile, the action of plunger 5 thus permitting the automobile to move beyond the point necessary to fully jack the automobile without causing damage to the bumper, bracket, or swinging bar as might be caused by inexperienced persons using a jack which is not provided with my novel safety ratchet and pawls, and continuing to apply the power after the automobile was fully jacked. In order to lower the jacked car, the vehicle is moved under its own power in the opposite direction and the axle 1 is prevented from rotating in such direction by the pawl 3 which is in constant engagement with the ratchet teeth 1b, the ratchet 3 thus permitting the swinging bar 2 to back away from the bumper bar B, to release the plunger 5 from contact with the bumper bar B, and permitting the pawl 4 to reengage the ratchet teeth 1b whereupon the axle 1 will not be permitted to rotate in either direction but will merely rock on the road surface as the automobile is moved to unjack the car.

Continued movement of the car in said direction will restore the parts to the position shown in Fig. 2, whereupon the jack including the brackets 8 may be readily removed from the vehicle by removal of the lifting bar 9 of the bracket from engagement of the undersides of the bumper brace bars B'.

I do not limit my invention to the exact form shown in the drawing, for obviously changes may be made therein within the scope of the claims.

I claim:

1. A vehicle jack comprising a swingable bar adapted to be pivotally connected in inclined position to a vehicle body and caused to assume a substantially vertical jacking position by movement of the vehicle towards said bar, the swinging movement of the bar into jacking position being limited by contact of the bar with a portion of the vehicle body; a ground wheel journaled at the lower end of said bar; means normally preventing rotation of said wheel in either direction; and means on the bar actuated by the contact against said portion of the vehicle body to release said rotation preventing means and permit rotation of the ground wheel in the direction of movement of the vehicle during the jacking operation while preventing rotation in the opposite direction.

2. In a jack as set forth in claim 1, said relatively fixed portion of the vehicle being the vehicle bumper; and a bracket pivotally connected with the upper end of the swingable bar and having means for connection with the bumper.

3. In a jack as set forth in claim 1, said releasing means comprising a plunger yieldably mounted on the bar and adapted to impinge upon the portion of the vehicle body and to be shifted thereby; and means connecting the plunger and preventing means to release the latter when the plunger is shifted.

4. A vehicle jack comprising a swingable bar adapted to be pivotally connected in inclined position to a vehicle body and caused to assume a substantially vertical jacking position by movement of the vehicle towards said bar, the swinging movement of the bar into jacking position being limited by contact of the bar with a portion of the vehicle body; a ground wheel journaled at the lower end of said bar; means normally preventing rotation of said wheel in either direction; means on the bar actuated by the contact against said relatively fixed portion of the vehicle body to release said rotation preventing means and permit rotation of the ground wheel in the direction of movement of the vehicle during the jacking operation while preventing rotation in the opposite direction; and means for restoring the contact actuated means and the preventing means to normal positions when the bar is disengaged from the vehicle body to permit the vehicle to be unjacked.

5. In a jack as set forth in claim 4, said relatively fixed portion of the vehicle being the vehicle bumper; and a bracket pivotally connected with the upper end of the swingable bar and having means for connection with the bumper.

6. In a jack as set forth in claim 4, said releasing means comprising a plunger yieldably mounted on the bar and adapted to impinge upon the portion of the vehicle body and to be shifted thereby; and means connecting the plunger and preventing means to release the latter when the plunger is shifted.

7. A vehicle jack comprising a swingable bar adapted to be pivotally connected in inclined position to a vehicle body and caused to assume a substantially vertical jacking position by movement of the vehicle towards said bar, the swinging movement of the bar into jacking position being limited by contact of the bar with a portion of the vehicle body; said bar having a bearing at its lower end; an axle journaled in said bearing; ground wheels fixedly mounted on the axle; ratchet teeth on said axle; opposed spring pressed pawls carried by the bar and normally engaging the ratchet teeth to prevent rotation of the axle in either direction, said pawls each permitting rotation of the axle in respectively opposite directions when the other pawl is disengaged; and means on the bar actuated by the contact with said portion of the vehicle body when in fully jacked position to release one of said pawls and permit rotation of the axle and ground wheels in the direction of movement of the vehicle during the jacking operation.

8. In a jack as set forth in claim 7, said relatively fixed portion of the vehicle being the vehicle bumper; and a bracket pivotally connected with the upper end of the swingable bar and having means for connection with the bumper.

9. In a jack as set forth in claim 7, said releasing means comprising a plunger yieldably mounted on the bar and adapted to impinge upon the relatively fixed portion of the vehicle body and to be shifted thereby; and means connecting the plunger and releasable pawl whereby the pawl will be released when the plunger is shifted.

10. A vehicle jack comprising a swingable bar adapted to be pivotally connected in inclined position to a vehicle body and caused to assume a substantially vertical jacking position by movement of the vehicle towards said bar, the swinging movement of the bar into jacking position being limited by contact of the bar with a portion of the vehicle body; said bar having a bearing at its lower end; an axle journaled in said bearing; ground wheels fixedly mounted on the axle; ratchet teeth on said axle; opposed spring pressed pawls carried by the bar and normally engaging the ratchet teeth to prevent rotation of the axle in either direction, said pawls each permitting rotation of the axle in respectively opposite directions when the other pawl is disengaged; means on the bar actuated by the contact with said portion of the vehicle body when in fully jacked position to release one of said pawls and permit rotation of the axle and ground wheels in the direction of movement of the vehicle during the jacking operation; and means for restoring the releasable pawl to normal position when the bar is disengaged from the vehicle body to permit the vehicle to be unjacked.

11. In a jack as set forth in claim 10, said relatively fixed portion of the vehicle being the vehicle bumper; and a bracket pivotally connected with the upper end of the swingable bar and having means for connection with the bumper.

12. In a jack as set forth in claim 10, said releasing means comprising a plunger yieldably mounted on the bar and adapted to impinge upon the relatively fixed portion of the vehicle body and to be shifted thereby; and means connecting the plunger and releasable pawl whereby the pawl will be released when the plunger is shifted.

JOHN E. HINES.